(12) United States Patent
Keelan et al.

(10) Patent No.: US 7,304,677 B2
(45) Date of Patent: Dec. 4, 2007

(54) CUSTOMIZING A DIGITAL CAMERA BASED ON DEMOGRAPHIC FACTORS

(75) Inventors: Brian W. Keelan, Rochester, NY (US); Richard B. Wheeler, Webster, NY (US); Kenneth A. Parulski, Rochester, NY (US); Girish V. Prabhu, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 703 days.

(21) Appl. No.: 10/215,808

(22) Filed: Aug. 9, 2002

(65) Prior Publication Data

US 2003/0025811 A1    Feb. 6, 2003

Related U.S. Application Data

(63) Continuation-in-part of application No. 09/736,050, filed on Dec. 13, 2000, now Pat. No. 6,903,762.

(51) Int. Cl.
  *H04N 5/222* (2006.01)
  *H04N 9/73* (2006.01)
(52) U.S. Cl. .................. 348/333.01; 348/223.1
(58) Field of Classification Search ........... 348/333.01, 348/333.02, 223.1; 345/745, 771; 396/177, 396/158
  See application file for complete search history.

(56) References Cited

U.S. PATENT DOCUMENTS

| 4,642,678 A | 2/1987 | Cok |
| 4,774,574 A | 9/1988 | Daly et al. |
| 4,962,419 A | 10/1990 | Hlbbard et al. |
| 5,189,511 A | 2/1993 | Parulski et al. |
| 5,323,203 A * | 6/1994 | Maruyama et al. ........... 396/57 |
| 5,477,264 A * | 12/1995 | Sarbadhikari et al. ... 348/231.6 |
| 5,493,335 A | 2/1996 | Parulski et al. |
| 5,633,678 A | 5/1997 | Parulski et al. |
| 5,640,205 A * | 6/1997 | Munakata et al. .......... 348/253 |
| 5,652,621 A | 7/1997 | Adams, Jr. et al. |
| 5,734,425 A | 3/1998 | Takizawa et al. |
| 5,914,748 A | 6/1999 | Parulski et al. |

(Continued)

FOREIGN PATENT DOCUMENTS

JP    2000-270247    * 9/2000 .................. 5/225

OTHER PUBLICATIONS

PCCard Standard, Release 2.0, published by the Personal Computer Memory Card International Association, Sunnyvale, California, Sep. 1991.

(Continued)

*Primary Examiner*—Lin Ye
*Assistant Examiner*—Kelly Jerabek
(74) *Attorney, Agent, or Firm*—Thomas J. Strouse

(57) ABSTRACT

A method for customizing a camera for at least one particular demographic group is disclosed. The camera includes a programmable memory that stores at least one parameter value to control at least one operation of the camera. The method includes the steps of identifying at least one camera parameter having a preferred value for at least one demographic group that differs from the standard value for said parameter, selecting a demographic classification for the camera, and programming the programmable memory of the camera to set the parameter value to the preferred value for the selected demographic classification.

20 Claims, 13 Drawing Sheets

U.S. PATENT DOCUMENTS 6,160,961 A * 12/2000 Tanabe ........................ 396/177
6,587,129 B1 * 7/2003 Lavendel et al. ............ 715/776
6,608,650 B1 * 8/2003 Torres et al. ........... 348/333.02
7,133,070 B2 * 11/2006 Wheeler et al. ......... 348/223.1

OTHER PUBLICATIONS

CompactFlsh Specification Version 1.3, published by the CompactFlash Association, Palo Alto, California, Aug. 5, 1998.

* cited by examiner

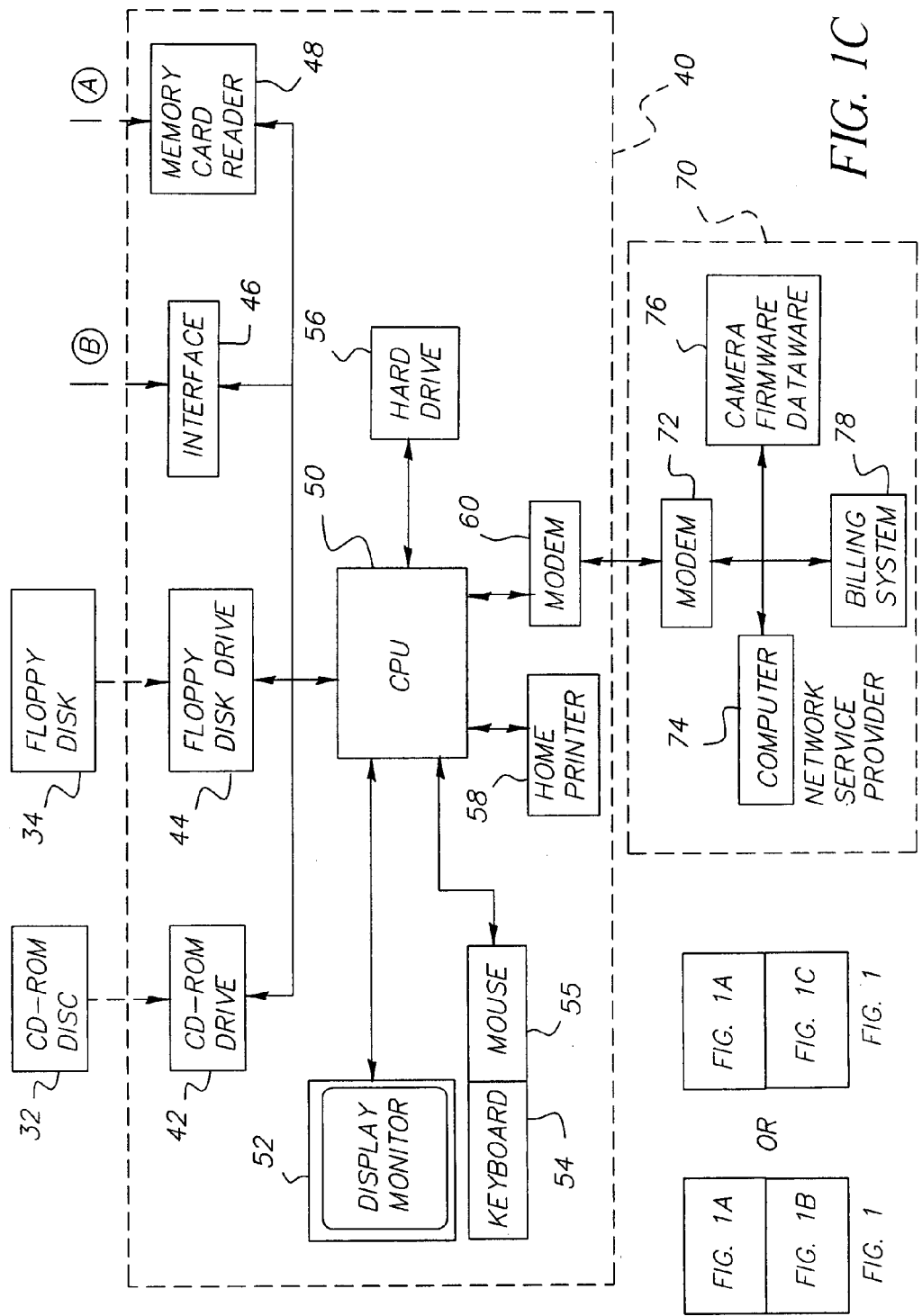

CUSTOMIZING A DIGITAL CAMERA BASED ON DEMOGRAPHIC FACTORS

CROSS REFERENCE TO RELATED APPLICATIONS

This is a continuation in part of application Ser. No. 09/736,050, entitled "Customizing a Digital Camera for a Plurality of Users", filed 13 Dec. 2000 now U.S. Pat. No. 6,903,762.

FIELD OF THE INVENTION

This invention relates generally to the field of cameras, and in particular, to customizing the design and behavior of such cameras for particular demographic groups.

BACKGROUND OF THE INVENTION

There are aspects of image quality and camera complexity and cost that can be optimized for use by specific demographic groups. An example of a feature set for which the optimum configuration depends on demographic factors are those features pertaining to the reduction or elimination of the image artifact called redeye. As is well known in the art, redeye may occur when the angle between a narrow light source, the photographic subject, and the camera lens is less than approximately three degrees. This criterion is frequently met in flash exposures from compact cameras. The light from the flash enters the pupil nearly on-axis and propagates to the fundus of the eye, where it is reflected back out of the eye, having been colored red by the blood vessels in the fundus. The light exits the eye in a narrow cone, and if the camera lens falls within that cone, the red reflection will be recorded, and may appear in the final image as a red glow in the pupils, which is very undesirable in terms of image quality.

Redeye is more objectionable when the size of the pupil in the viewed image is larger and when the red saturation of the pupil is greater. The former may occur when the pupil is dilated, as occurs at low ambient light levels, or when the subject is rendered at a larger size in the image, for example due to shorter camera to subject distance, longer camera lens focal length, higher printing magnification (including zoom and crop), and/or shorter viewing distance. The primary techniques used in the camera to reduce or eliminate redeye are: increasing flash to lens separation; firing a preflash to transiently stop down the pupil in response to the bright light; and decreasing lens focal length and/or electronic zoom.

While all these methods are efficacious, all have associated disadvantages. Increased flash-lens separation may lead to more expensive and bulkier cameras and produces more noticeable shadows due to the farther off-axis lighting. After a preflash is fired, the eye requires half a second or more to respond fully, and during this delay between the preflash fire and the image capture, facial expressions of the subject often change in an undesirable fashion due to the annoyance and surprise of the preflash. The preflash also increases camera cost, reduces the power available during the main flash pulse, and increases battery consumption. Finally, restriction of optical or electronic zoom factors interferes with the photographer's ability to obtain the desired composition, with the subjects appearing large enough in the image to provide a pleasing rendition.

Digital cameras, such as the Kodak DC260™ digital camera, sold by the Eastman Kodak Company, enable images to be utilized on a home personal computer (PC), printed locally or remotely, and incorporated into e-mail documents and personal World-Wide-Web home pages which can be accessed via the Internet. The camera's graphic user interface (GUI) enables many different features to be selected, but it is complicated, and thus, very difficult for a first-time user to understand. The camera provides a fixed set of features to the end user. These features can be controlled by Digita Scripts specified by Flashpoint, Inc. Digita Scripts are ASCII text files created with a text editor on a host computer. Such Scripts may be invoked to select particular camera features and to perform a defined sequence of camera operations. For example, a Script may capture an exposure series of still pictures using different exposure settings.

This type of camera design presents several problems, including the fact that any feature that is likely to be demanded by even a small subset of the users must be included in the camera. A consequence of this is that the complexity of digital cameras has increased. This leads to an increase in user anxiety, and therefore, serves as a barrier to market adoption.

The firmware in the DC260™ digital camera, for example, can be replaced via a memory card, as described in commonly-assigned U.S. Pat. No. 5,477,264, entitled "Electronic Imaging System Using A Removable Software-Enhanced Storage Device," the disclosure of which is herein incorporated by reference. Images can be assigned to albums, as described in commonly-assigned U.S. Pat. No. 5,633,678, entitled "Electronic Still Camera For Capturing And Categorizing Images," the disclosure of which is herein incorporated by reference.

Commonly-assigned U.S. patent application Ser. No. 08/977,382, filed Nov. 24, 1997, entitled "Electronic Camera With Utilization Selection Capability" and U.S. patent application Ser. No. 09/004,046, filed Jan. 7, 1998, entitled "Network Configuration File for Automatically Transmitting Images from an Electronic Still Camera" to Ward et al., the disclosures of which are herein incorporated by reference, disclose digital cameras which are provided with host software that enables templates, e-mail addresses, and other information to be selected at the host computer, downloaded to the digital camera, and used, for example, to automatically produce prints and e-mail images. Although this enables user-selected information (such as preferred templates and personalized e-mail addresses) to be downloaded to the digital camera, the actual features of the digital camera normally remain the same for all users who have the same camera model.

SUMMARY OF THE INVENTION

Accordingly, it is an object of the present invention to customize a camera based on demographic factors.

It is a further object of the present invention to enable the customer or retailer to customize a digital camera based on demographic factors.

It is yet another object of the present invention to enable a user to easily add or remove the features that the user wants or does not want, to a digital camera that has been customized based on demographic factors.

These objects are achieved by a method for customizing a camera for at least one particular demographic group by storing at least one parameter value in a programmable memory of the camera to control at least one operation of the camera, the method comprising the steps of:

a) identifying at least one camera parameter having a preferred value for at least one demographic group that differs from the standard value for said parameter;
b) selecting a demographic classification for the camera; and
c) programming the programmable memory of the camera to set the parameter value to the preferred value for the selected demographic classification.

ADVANTAGES

It is an advantage of the present invention to enable film and digital cameras to be customized for different demographic groups.

It is another advantage of the present invention to enable efficient, inexpensive customization of cameras in cases where different characteristics are required to optimize image quality and minimize cost for different demographic groups.

BRIEF DESCRIPTION OF THE DRAWINGS

FIGS. 1A, 1B, and 1C, when taken together, are a block diagram of a digital imaging system in accordance with the present invention for customizing a digital camera 10 based on demographic factors;

DETAILED DESCRIPTION OF THE INVENTION

Figure 1A:
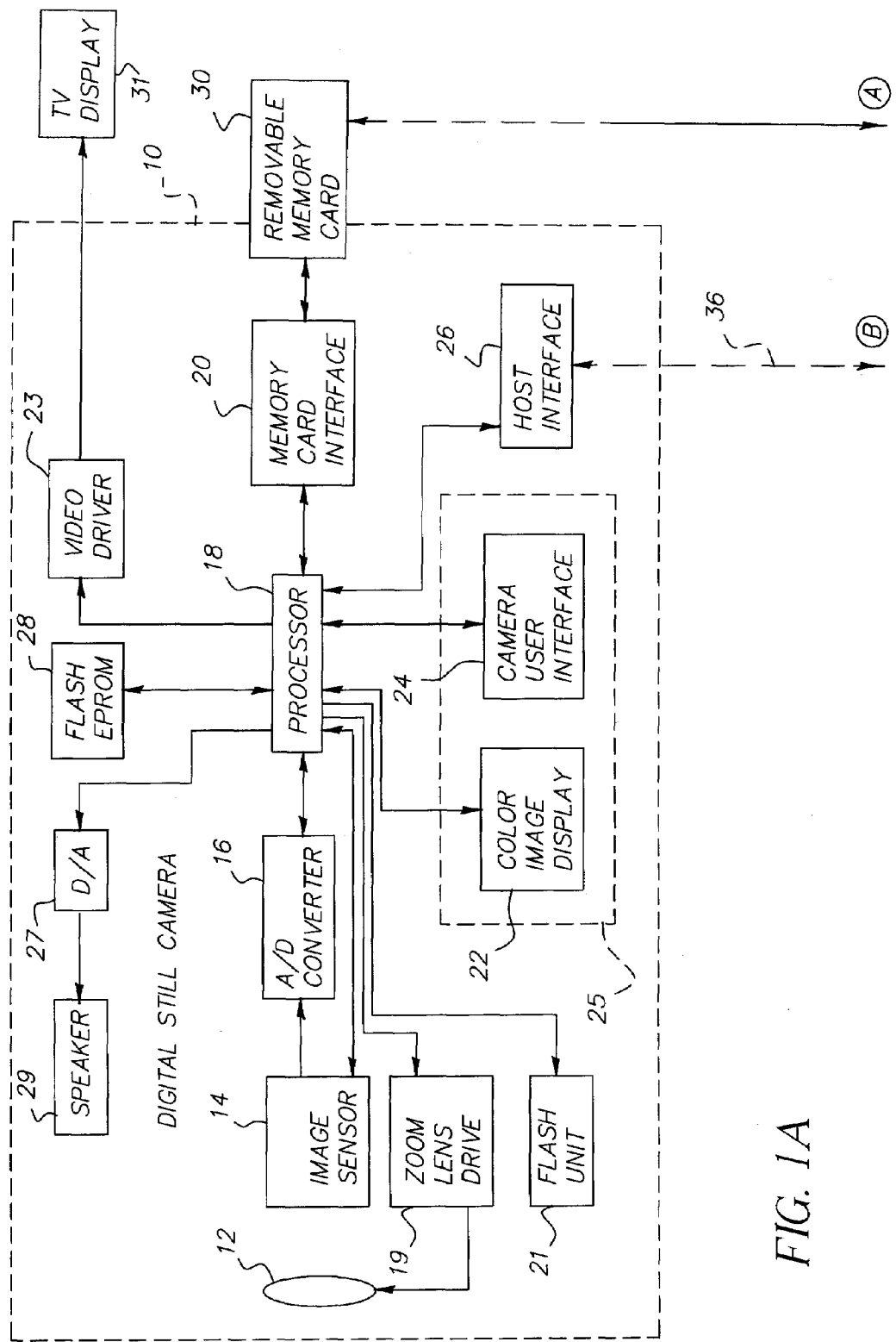

The inventors of the present invention have conducted experiments which determined that the severity of redeye is a strong function of demographic classification of the subject photographed. This is due to two effects. First, more highly pigmented races tend to have more melanin in their pupils, which attenuates the light propagating through the pupil via absorption, and reduces the amount of red light exiting the eye. Second, as people age, the maximum diameter to which their pupil will dilate at low light levels decreases. Consequently, young people exhibit larger pupil sizes than older people under the conditions in which flash photographs are typically taken. The dramatic nature of the dependence of redeye severity on demographics is demonstrated in Table I, which shows the frequency of occurrence of noticeable redeye in over one hundred subjects belonging to different demographic groups and photographed under rigidly controlled conditions (0.1 foot-candles ambient light; 2.6 inch flash to lens separation; subject distance 6 feet; no preflash; focal length 80 mm; normally viewed 4×6 inch print from 35-mm format film).

TABLE I

Effect of demographics on frequency of redeye

| Demographic Group | Caucasian Youth | Caucasian Adult | Hispanic | Asian | African-American |
|---|---|---|---|---|---|
| Frequency of Occurrence | 82% | 70% | 41% | 15% | 9% |

Both the pigmentation and age affects are evident in this data, although the age effect is more obvious at 3.8 inches flash to lens separation (with other parameters the same), where Caucasian adults exhibit redeye only 20% of the time, but Caucasian youth show redeye in 67% of photographs.

These data demonstrate that, whereas a camera targeted at the youth market in the United States might require preflash, greater flash-lens separation, and optical and/or electronic zoom restrictions to control redeye successfully, a camera intended for an Asian market might require none of these features, with potentially significant improvements in size, cost, and image quality.

In an embodiment of this invention, the demographic data is used to customize the fashion in which the camera sets the zoom factor, the preflash output, and/or the flash-lens separation distance. For example, Table II shows combinations of zoom factor, preflash output, and flash-lens separation distance, which yield the same average image quality loss due to redeye for four different demographic groups. The older and/or more pigmented groups require less restriction of zoom factor, less preflash output (a guide number of zero corresponds to an absence of a preflash entirely), and less flash-lens separation due to their lower propensity to redeye. These results are for a camera to subject distance of 10 feet, an ambient light level of 3 foot-candles, a zoom factor one corresponding approximately to normal perspective, and an average quality loss of 1.5 just noticeable differences.

TABLE II

Camera parameters yielding equal mean quality loss from redeye for several demographic groups

| Demographic Group | Caucasian Youth | Caucasian Adult | Hispanic | Asian |
|---|---|---|---|---|
| Relative Zoom Factor | 1.0 | 1.7 | 2.3 | 3.0 |
| Preflash Guide Number (feet at ISO 100) | 18 | 14 | 6 | 0 |
| Flash-Lens Separation (inches) | 2.8 | 2.2 | 1.6 | 1.2 |

A second example of camera properties for which different demographic groups might have different preferences is in the area of color and tone reproduction, particularly with regard to skin-tone rendition. Experiments have shown that the preferred rendering of skin tones is not a perfect match to the actual skin tone color; for example, some fair-skinned races like to appear more tanned in a photograph than they actually are. Experiments have shown that the shift between true color and preferred color for skin tones are different for different demographic groups. Consequently, a single color reproduction position is not optimal for all demographic groups. Table III demonstrates the magnitude of this difference in preference. The percentages of Caucasians and Chinese who prefer the average Caucasian optimum position and the average Chinese optimum position, which is relatively lighter and warmer in color balance, are compared.

TABLE III

Effect of demographics on skin tone reproduction preferences

| Preference | Caucasian | Chinese |
|---|---|---|
| Darker, cooler | 91% | 5% |
| Lighter, warmer | 9% | 95% |

These data demonstrate that it is very advantageous to optimize the color and tone reproduction of a camera to account for demographic preference.

Table IV shows how color and tone reproduction parameters might be changed to customize a camera with optimal reproduction for Caucasians to produce optimal reproduction for a Chinese market. A tone correction lookup table is generated by a tone correction function that relates the uncorrected code value x to the corrected code value y. The values a, b, and c are constants chosen to optimize the reproduction under certain circumstances, in this case for the Caucasian demographic group. The change in the tone correction function for Chinese customization lightens the image. Similarly, the color correction matrix shown, which is representative of current digital still cameras, is assumed to be optimized for Caucasian preference. The change in the color correction matrix for Chinese customization shifts the color balance in a warmer direction. Four of the nine matrix elements are altered.

TABLE IV

Camera parameters yielding preferred skin tone reproduction

| Preference | Caucasian | Chinese |
|---|---|---|
| Tone Correction Function | $y = a + b \cdot x^c$ | $y = a + 1.03 \cdot b \cdot x^c$ |
| Color Correction Matrix | 1.69  −0.30  −0.39<br>−0.32   1.38  −0.06<br>−0.60  −0.74   2.34 | 1.61  −0.30  −0.31<br>−0.32   1.38  −0.06<br>−0.64  −0.74   2.38 |

Other examples of demographically based customization may be envisioned based on regional usage profiles. For example, in some countries, such as India, relatively more images contain people as their primary subject, and relatively fewer pictures are of scenery or buildings, as are often photographed on vacations. In such circumstances, image processing pathways could be customized for rendition of people rather than scenery and buildings, for example by decreasing sharpening, increasing noise reduction, decreasing color saturation, etc. In addition, different color can have different connotations in different countries. Therefore, the preferences for the background color used in a graphical user interface on a digital camera can be demographically based.

Figure 1B:
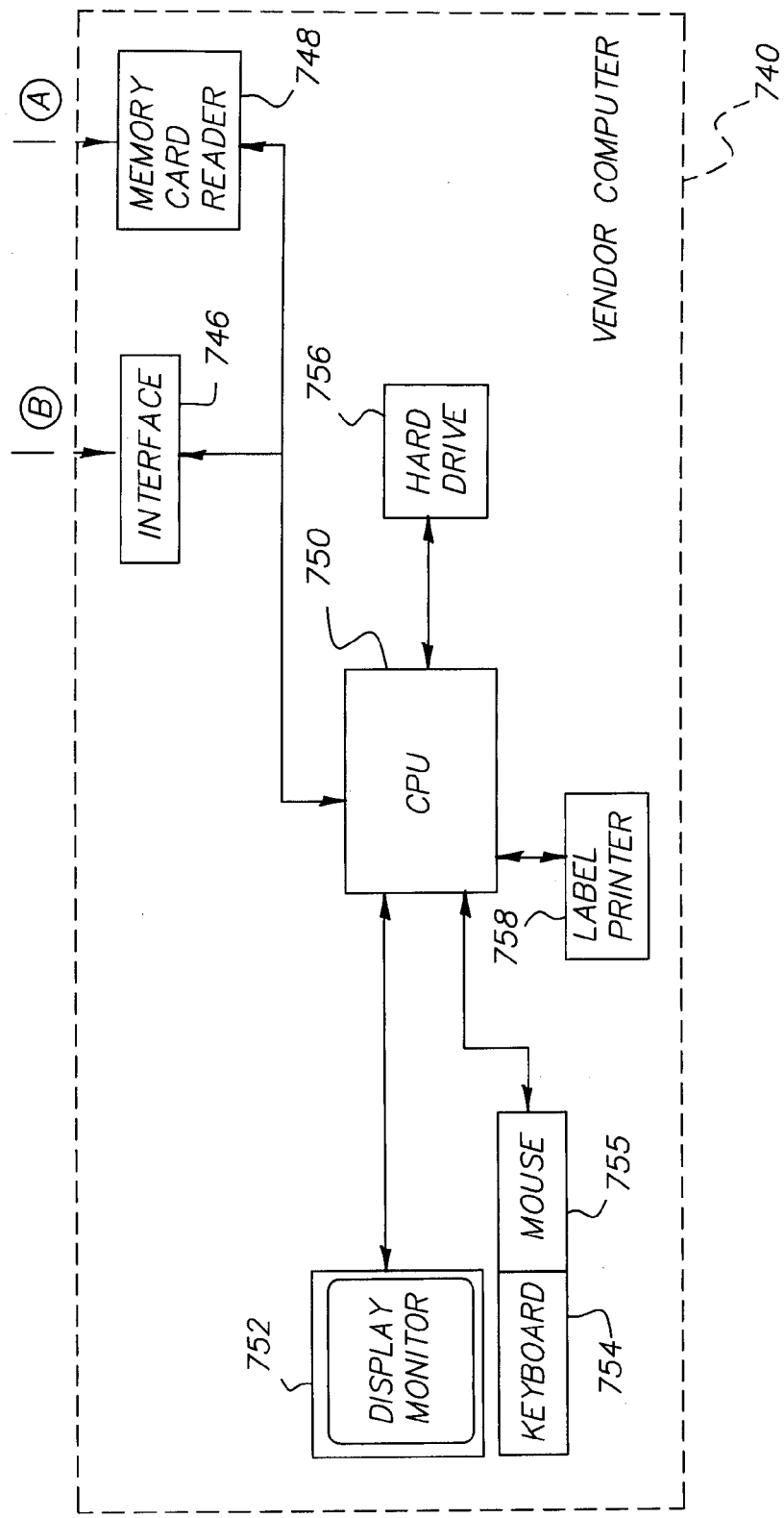

FIGS. 1A, 1B, and 1C, when taken together, are a block diagram of a digital imaging system in accordance with the present invention, which enables a camera to be customized by a vendor (e.g. a manufacturer or retailer) based on demographic factors, and enables purchasers of such cameras to further customize the graphical user interface and features of their digital camera prior to taking pictures. The digital imaging system includes a digital camera 10, which is supplied to the purchaser along with camera customization software provided on a compact disc CD-ROM 32, a floppy disk 34, or other digital media. The digital imaging system also includes a vendor computer 740, a host computer 40 (typically owned by the purchaser of the digital camera 10) and a Network Service Provider 70, which typically has a business relationship with the vendor of the digital camera 10.

In accordance with one preferred embodiment of the present invention, the firmware stored in the Flash EPROM 28 of the digital camera is customized by the vendor based on demographic factors by the vendor computer 740, and provided to the purchaser along with a CD-ROM disc 32, floppy disc 34, or other digital storage media containing camera customization software. This camera customization software is then executed external to the digital camera 10, typically on the purchaser's host computer 40. The software code can include source code, which is compiled by the camera customization software to create executable firmware. Alternatively, the software code can include compiled firmware components or firmware settings which are accessed by the camera customization software. The camera customization software can modify or combine firmware components in order to provide firmware which customizes the digital camera 10 for a particular user. The camera customization software can also include one or more applications that provide a series of interactive dialogues with the user so that the user may learn about available camera features and select features of interest. In an alternative embodiment, the vendor computer 740 is not used, and the digital camera 10 is provided using the same firmware independent of demographic factors. The camera customization software executed on the purchaser's host computer 40 instead accesses software code which permits the firmware in the digital camera 10 to be customized based on demographic factors.

In another alternative embodiment, the purchaser's host computer 40 is not used, and the vendor (e.g. a retailer) customizes the digital camera 10 using the vendor computer 740 based on demographic factors. In this embodiment, the vendor can also customize the digital camera 10 in accordance with purchaser decisions made at the time of sale.

As shown in FIG. 1A, the digital camera 10 produces digital images that are stored on a removable memory card 30. The digital camera 10 includes an optical viewfinder 11 (shown in FIG. 4C) for composing a scene (not shown), a 3:1 zoom lens 12 controlled by a zoom lens driver 19 which is in turn controlled by a processor 18 in response to a zoom switch 13 (shown in FIG. 4C) The zoom lens 13 is controlled and focused by zoom and focus motor drives which are included in zoom lens drive 19. The zoom lens 13 includes an adjustable aperture and shutter (not shown) for focusing light from a scene onto an image sensor 14. A flash unit 21 illuminates to provide a red-eye reduction flash and a main flash when the image capture process is initiated. The light level of the preflash is set by a firmware parameter value stored in a Flash EPROM 28.

The image sensor 14 can be, for example, a single-chip color charge-coupled device (CCD) or CMOS image sensor, using the well-known Bayer color filter pattern. When the user depresses a shutter button 15 (shown in FIG. 4C), the flash unit 21 provides a preflash and a main flash if necessary, and the image is captured using the image sensor 14.

The analog output signal from the image sensor 14 is converted to digital data by an analog-to-digital (A/D) converter 16. The digital data is processed by a processor 18 controlled by firmware stored in a reprogrammable memory, such as a Flash EPROM 28.

The processed digital image file is provided to a memory card interface 20 which stores the digital image file on the removable memory card 30 or on another type of digital memory device, such as a floppy disk or magnetic hard drive. The removable memory card 30, which is well-known to those skilled in the art, can include, for example, a memory card adapted to the PCMCIA card interface standard, as described in the *PC Card Standard, Release* 2.0, published by the Personal Computer Memory Card international Association, Sunnyvale, Calif., September 1991. The removable memory card 30 can also be adapted to the Compact Flash interface standard, such as described in the *CompactFlash Specification Version* 1.3, published by the CompactFlash Association, Palo Alto, Calif., Aug. 5, 1998, or to other memory devices such as the well-known SSFDC (Solid State Floppy Disc Card) or Memory Stick formats.

The processor 18 performs color interpolation followed by color and tone correction, in order to produce rendered sRGB image data. This processing is described later with reference to FIG. 8. The processor 18 can include internal buffer memory to store a portion of the image, or to store one or more images. Alternatively, the processor 18 can use a separate external memory (not shown), such as DRAM memory. The rendered sRGB image data is then JPEG compressed and stored as a JPEG image file on the removable memory card 30. The processor 18 also provides a lower resolution or "thumbnail" size image data to a color image display 22, such as a color liquid crystal display (LCD), which displays the captured image for the user to review. A camera user interface 24 including a series of user buttons 80, 81, 82, 83, and 84 (shown in FIG. 4C) and a capture/review mode switch 86 (shown in FIG. 4C), is used to control the digital camera 10. The camera user interface 24, together with text and icons displayed on the image display 22 (shown also in FIG. 4C), forms the camera graphical user interface (GUI). This GUI is controlled by the user interface portion of the firmware stored in the Flash EPROM 28. The digital camera 10 can also include a digital-to-analog (D/A) converter 27 and a miniature speaker 29 (also shown in FIG. 4C) which makes audible sounds when a new picture is taken, or when the user changes modes or advances to review the next stored image. The digital camera 10 can also include a video output driver 23 which connects to a TV display 31, such as an NTSC format home television, for displaying the captured images on the TV display 31. The digital camera 10 further includes a strobe flash unit (not shown) for illuminating the subject when the ambient illumination level is low.

After a series of images has been taken by the digital camera 10 and stored on the removable memory card 30, the removable memory card 30 can be inserted into a memory card reader 48 in the host computer 40. Alternatively, an interface cable 36 can be used to connect between a host interface 26 in the digital camera 10 and a camera interface 46 in the host computer 40. The interface cable 36 may conform to, for example, the well-know universal serial bus (USB) interface specification.

The captured images from the digital camera 10 can be downloaded to the purchaser's host computer 40 and stored on a hard drive 56 under the control of a central processing unit (CPU) 50. The CPU 50 is coupled to a display monitor 52, which is used to view the images, and a keyboard 54. A mouse 55 permits the user to readily communicate with the CPU 50. The CPU 50 communicates with a 25 local printer 58, such as an Epson Stylus Photo 700 printer, which produces hard copy prints of the images captured by the digital camera 10.

The digital camera 10 that is supplied to the purchaser includes firmware stored in the Flash EPROM 28, which is programmed into Flash EPROM 28 using the vendor computer 740 before the camera is purchased, and provides normal camera features for the demographic group selected by the camera vendor. The vendor computer 740 operates under the control of a central processing unit (CPU) 750, and includes a hard drive 756. The hard drive 756 stores a plurality of camera firmware files (e.g. software programs that are used to control the operation of the processor 18 in the digital camera 10) to enable the camera 10 to be customized based on demographic factors, such as the location (e.g. country) where the camera 10 will be sold, and/or the likely age of the camera user. The CPU 750 is coupled to a display monitor 752 and a keyboard 754. A mouse 755 permits a representative of the vendor to readily communicate with the CPU 750 in order to make demographic selections from a menu of options. The CPU 750 communicates with a label printer 758, 7 which produces a label identifying the selected demographic group, which can be affixed to a box or other packaging into which the digital camera 10 is placed.

Users can further customize the look and feel, and the functions offered by the digital camera 10, using the camera customization software provided with the digital camera 10. This camera customization software is provided on the CD-ROM disc 32, which is loaded into the host computer 40 via the CD-ROM drive 42, or provided on the floppy disk 34, which is loaded into the host computer 40 via the floppy disk drive 44. The CD-ROM disc 32 or the floppy disk 34 can also include digital image application software, such as the Picture Easy™ version 3.1 software developed by the Eastman Kodak Company. Alternatively, this camera customization software can be downloaded from the Network Service Provider 70 via a modem 60. The modem 60 communicates with a modem 72 at the Network Service Provider 70, which is connected to a computer 74, a camera firmware database 76, and a billing system 78 which can charge the user (e.g., via a credit card) for downloading the camera customization software.

The CPU 750 and the CPU 50 transfer firmware to the Flash EPROM 28 in the camera 10 via the removable memory card 30, as described in commonly-assigned U.S. Pat. No. 5,477,264, entitled "Electronic Imaging System Using a Removable Software-Enhanced Storage Device" to Sarbadhikari et al., or via the interface cable 36 as described in commonly-assigned U.S. Pat. No. 5,734,425, entitled "Electronic Still Camera With Replaceable Digital Processing Program" to Takizawa et al., the disclosures of which are herein incorporated by reference. The process of storing firmware code in an EPROM and of erasing firmware code from an EPROM is well known in the art, and need not be discussed in detail.

Figure 2:
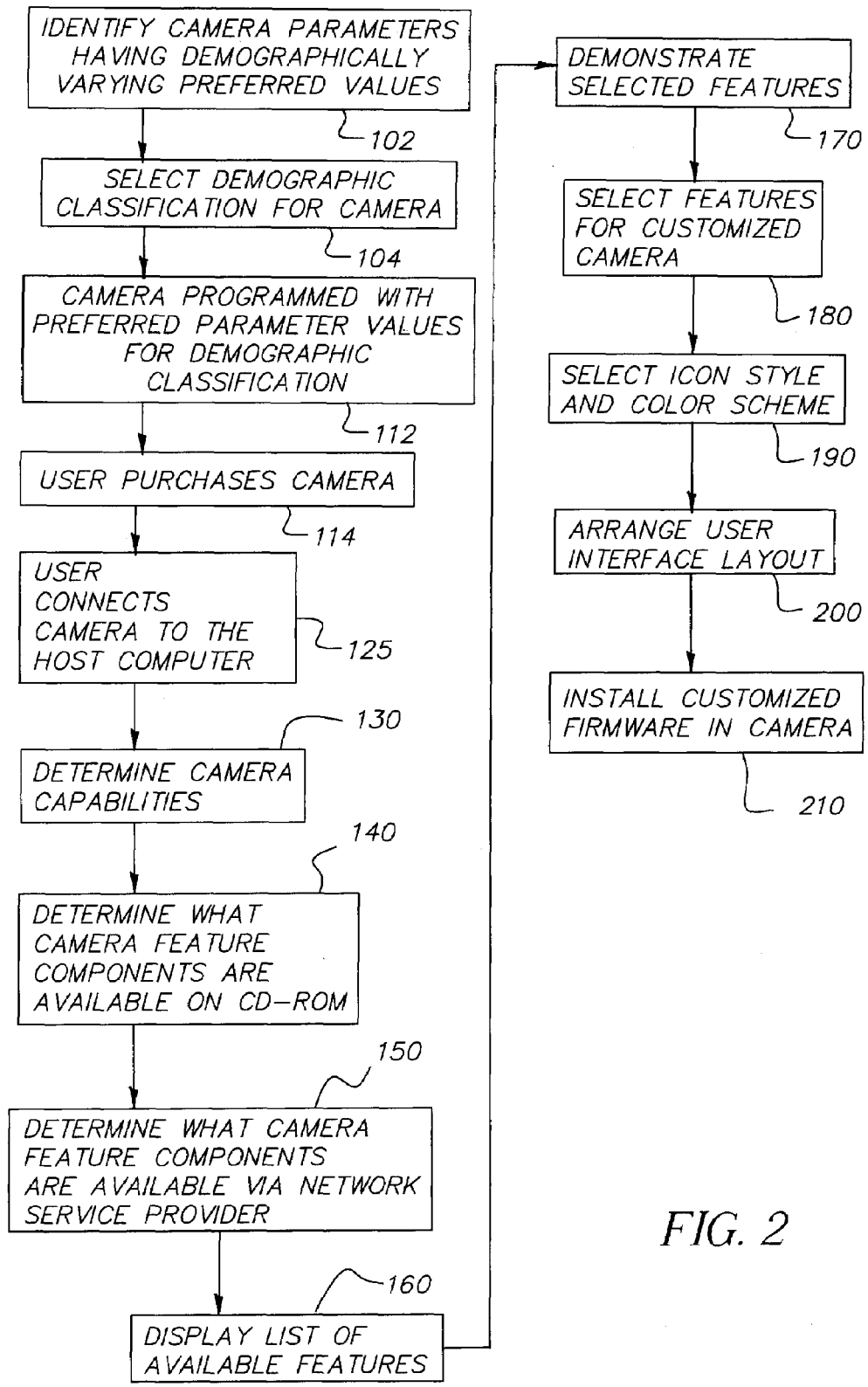
FIG. 2 is a flow diagram depicting the steps used in customizing the digital camera 10 of FIG. 1A.

FIG. 2 is a flow diagram depicting the steps of one preferred embodiment of a method for customizing the digital camera 10 of FIG. 1A in accordance with demographic factors. In block 102, the company designing the digital camera 10 identifies at least one camera parameter value having demographically varying preferred values. The identified camera parameter has a preferred value that depends upon the demographic classification of the user or the demographic mix of the marketplace. Typically, research is conducted to determine appropriate values of the parameter for different demographic groups.

In one embodiment of this invention, the demographic data is used to customize the fashion in which the processor 18 in the digital camera 10 sets the output of the preflash (e.g. the redeye reduction flash) provided by the flash unit 21, and sets the tone correction lookup table 532, and the color correction matrix 522, as was described earlier in relation to Table III and Table IV, and sets the background color, language, and icons used for the camera user interface.

In block 104, a demographic classification for a camera is selected. The selection can be made using the mouse 755 or keyboard 754 in conjunction with the display monitor 752. The demographic classification can be made by ascertaining the expected demographic classification distribution of purchasers based on regional destinations of the product. For example, a large group of cameras being manufactured may be destined for sale in Asia, and therefore an "Asian heritage" demographic classification is selected for each camera in this group. Alternatively, a group of cameras may be distributed using a particular type of retail store that caters to a particular age group (e.g. youth, senior citizens, etc.). In this case, an appropriate age demographic classification may be selected instead of (or in addition to) a heritage classification. Alternatively, a single camera may be manufacturer in response to a particular customer order, for example an order taken over the Internet, as described in commonly-assigned U.S. patent application Ser. No. 09/534,469, entitled "Configuring and purchasing imaging devices," to Parulski, the disclosure of which is herein incorporated by reference. In this case, the purchaser can provide both age and heritage demographic information.

In block 112, the firmware providing the preferred parameter values for the demographic classification selected in block 104 is programmed into the digital camera 10. This can be done by transferring firmware containing the preferred parameters from the hard drive 756 to the digital camera 10 via the interface cable 36 using the interface 746 or via the memory card 30 using the memory card reader 748. The hard drive 756 can store customized versions of the firmware, each particular version providing preferred parameter values for one demographic classification. The firmware includes a code identifying the corresponding demographic classification. The label printer 758 is used to produce a label (not shown), which identifies the demographic classification, and the label is attached to a box (not shown) which is used to contain the digital camera 10.

In block 114, a user purchases the digital camera 10.

In block 125, the user connects the digital camera 10 to their host computer 40 via the interface cable.

In block 130, the camera customization software then determines the capabilities of the digital camera 10 and demographic classification of the firmware currently stored in the Flash EPROM memory 28 of the digital camera 10. The capabilities of the digital camera 10 can be determined either by determining the camera model number or by determining the types of hardware features that the digital camera 10 can support and by the size of the memory of the Flash EPROM 28.

In block 140, the camera customization software determines which feature firmware components are available for this particular model camera via the software provided on the CD-ROM disc 32. In block 150, the camera customization software uses the modem 60 to determine whether the firmware components which provide the new features not stored on the CD-ROM disc 32 are available within the camera firmware database 76 at the Network Service Provider 70. The response from the Network Service Provider 70, received by the host computer 40, might include some firmware components that are available to the user at no charge, and other firmware components for which the user will be charged. In addition, the Network Service Provider 70 can track whether the user has previously purchased firmware components so that they can be downloaded again at no charge if the firmware component was lost by the user, or is otherwise unavailable. Further, the Network Service Provider 70 could offer discounts to the user based on previous purchases.

Figure 3:
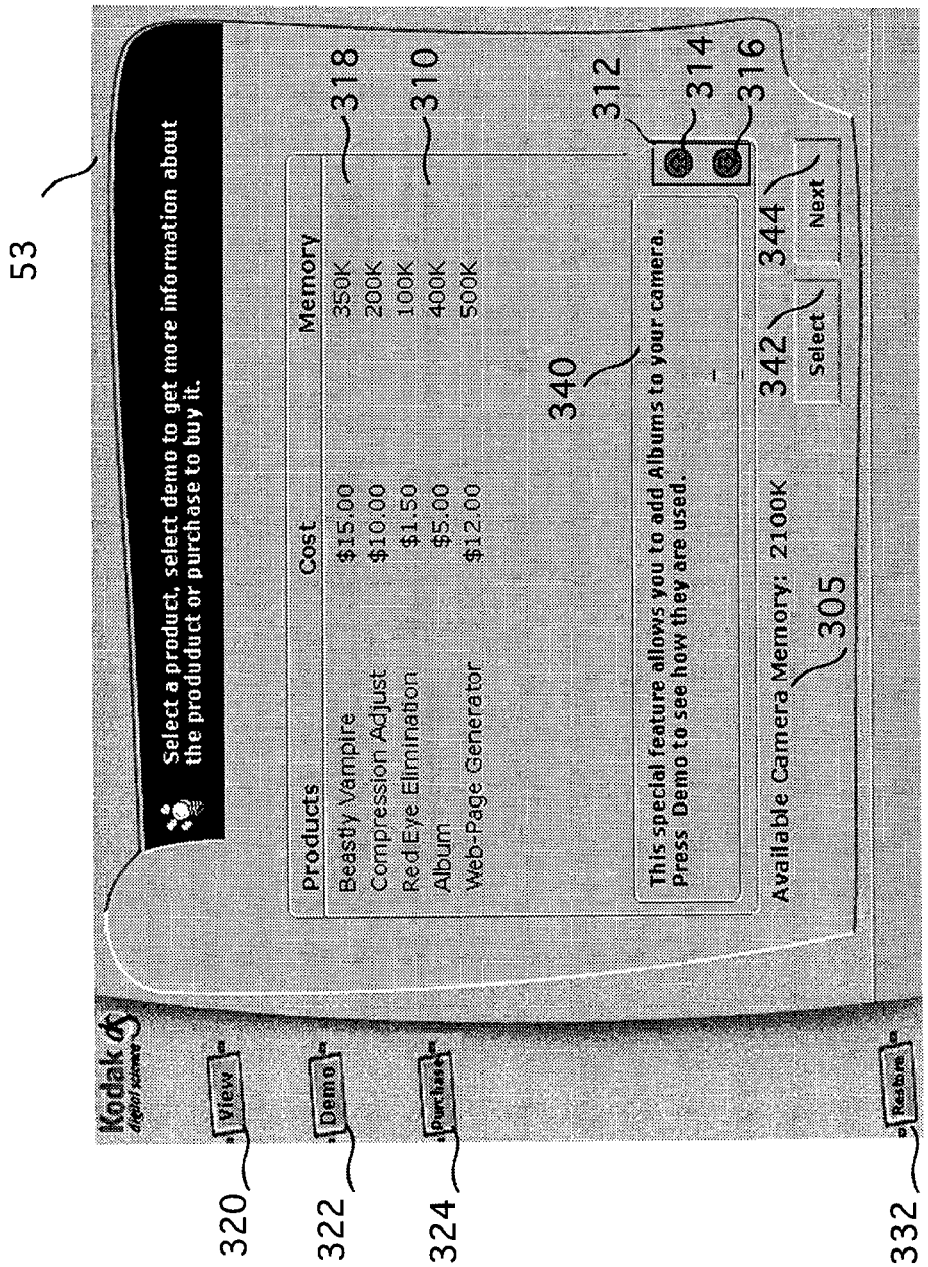
FIG. 3 illustrates a graphical screen displayed on the display monitor 52 of FIG. 1B in the process of further customizing the digital camera 10 of FIG. 1A.

In block 160, the features provided by the available firmware components are displayed to the user on the display monitor 52 through an on-screen listing of these features. An example screen 53 listing available features is shown in FIG. 3. The screen 53 lists the available camera firmware memory in a window 305, and the features that the user can select in a product option window 310. A scroll bar 312 having an up arrow 314 and a down arrow 316 permits the user to scroll through a long list of available options. The product option window 310 also lists the amount of camera firmware memory needed to store the firmware component that provides the option, and the cost of the option.

The features displayed in the example screen 53, and the order in which features are displayed, can be based on the demographic classification of the user, as provided by the code identifying the demographic classification stored as part of the firmware in Flash EPROM 28. Certain types of themes (e.g. Halloween special effects) are of much greater interest to some demographic classifications than to others.

To consider a particular option, the user clicks on a particular option line in the product option window 310, for example, the "Beastly Vampires" line 318, which highlights this line in the product option window 310, for example, by making the text bolder than the other lines, or changing the color of this line. A description window 340 provides a brief description of the option. In this example, the option is a package of features designed for the Halloween season that includes the ability to add custom borders and special digital picture overlays with a Halloween theme. It includes two different vampire border templates, and the ability to selectively paint "blood" on pictures of faces captured by the digital camera 10. If this component is selected by the user in block 180, the appropriate firmware will be added to the Flash EPROM memory 28 of the digital camera 10 in block 210 to control the processor 18 to enable the user, via the camera user interface 24, to selectively add the vampire border templates to specific images and to paint "blood drops" in appropriate areas of the images they have captured using the digital camera 10, as the image is displayed on the color image display 22.

The product option window 310 can display many different types of optional features and functions, which will be described later. Some of these are listed in the product option window 310 shown in FIG. 3. The options include a "compression adjust" feature which provides compression algorithm settings appropriate for taking pictures of documents, rather than of real-world scenes.

The options also include an "album" option that enables the user to upload, from the host computer 40 to the digital camera 10, particularly memorable personal images from various sources that are stored in the Flash EPROM memory 28, and for display on the color image display 22 or the TV display 31. These "album" images are compressed and stored as appropriate resolution images, typically having a greatly reduced number of pixels (and therefore a much smaller file size) than the images captured by the digital camera 10 and stored in the removable memory 30.

The options further include a web-page generator that automatically generates an html file using the captured images, as well as one or more of the stored album images. This feature may be customized by the user as part of the process depicted in FIG. 2 to produce a web page that has a customized background color or image, customized header text, customized image date format or titles, and customized image sizes.

In block 170 of FIG. 2, the user can select a demo of one or more features that he or she would like to see demonstrated. For example, in FIG. 3, after selecting the "Beastly Vampires" feature by clicking on line 318, the user can select the "demo" button 322. When a particular feature (e.g., the beastly vampires special package) is selected for demonstration, the demonstration software is provided from the same location which provides the corresponding firmware component (e.g., the CD-ROM 32 or Network Service Provider 70) in the form of a QuickTime movie, Macromedia director presentation, or another multi-media presentation that provides more information on the use and value of the particular feature. To return to the display depicted in FIG. 3, the user selects a "view" selector 320.

In block 180, the user selects the feature(s) that the user wants to be included in his/her digital camera 10. This is done by highlighting the desired options in the product option window 310 and then chooses a "select" selector 342. The user can start with a previous camera selection by selecting a "restore" selector 332, which permits the user to select and restore a camera feature set that was previously backed up, and use that as the starting point for a new feature set.

When one or more features must be purchased from the Network Service Provider 70, the purchaser selects a "purchase" selector 324 which provides a series of order menus (e.g., HTML web pages) generated by the Network Service Provider 70 and communicated to the computer 40 via the modem 60. The user pays for the firmware component(s) corresponding to the selected feature(s) by providing a payment identifier into a secured electronic commerce link which specifies a particular account which is to be charged or debited. The payment identifier can be a credit card number that specifies a particular credit card account. As used in this specification, a credit card will also include a debit card. The number of features that can be selected depends on the size of the firmware component(s) needed to implement the features, and the size of the firmware memory in the camera's Flash EPROM 28.

In block 190, the user is provided with the ability to modify the icon schemes and background colors for then demographically selected camera Graphical User Interface (GUI) 25 provided by the firmware stored in the Flash EPROM 28 of the digital camera 10 in block 112. The GUI 25 is displayed on the color image display 22 of the digital camera 10, shown in FIG. 4C. This GUI modification opportunity occurs after the user selects a "next" selector 344 shown in FIG. 3.

Figure 4A:
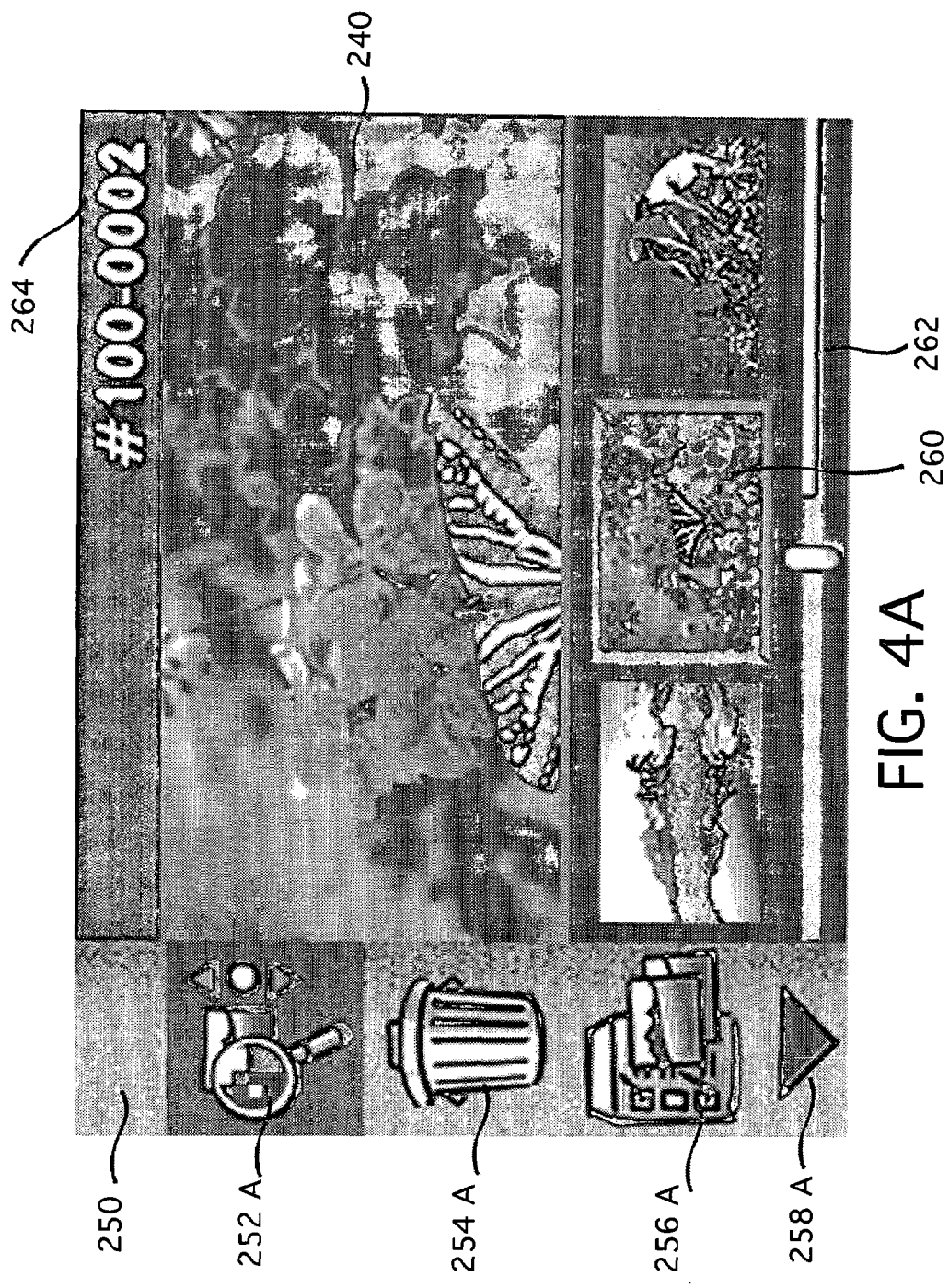
FIGS. 4A and 4B illustrate two different camera graphical user interface screens displayed on the color image display 22 of the digital camera 10 of FIG. 1A for two different demographic groups.
Figure 4B:
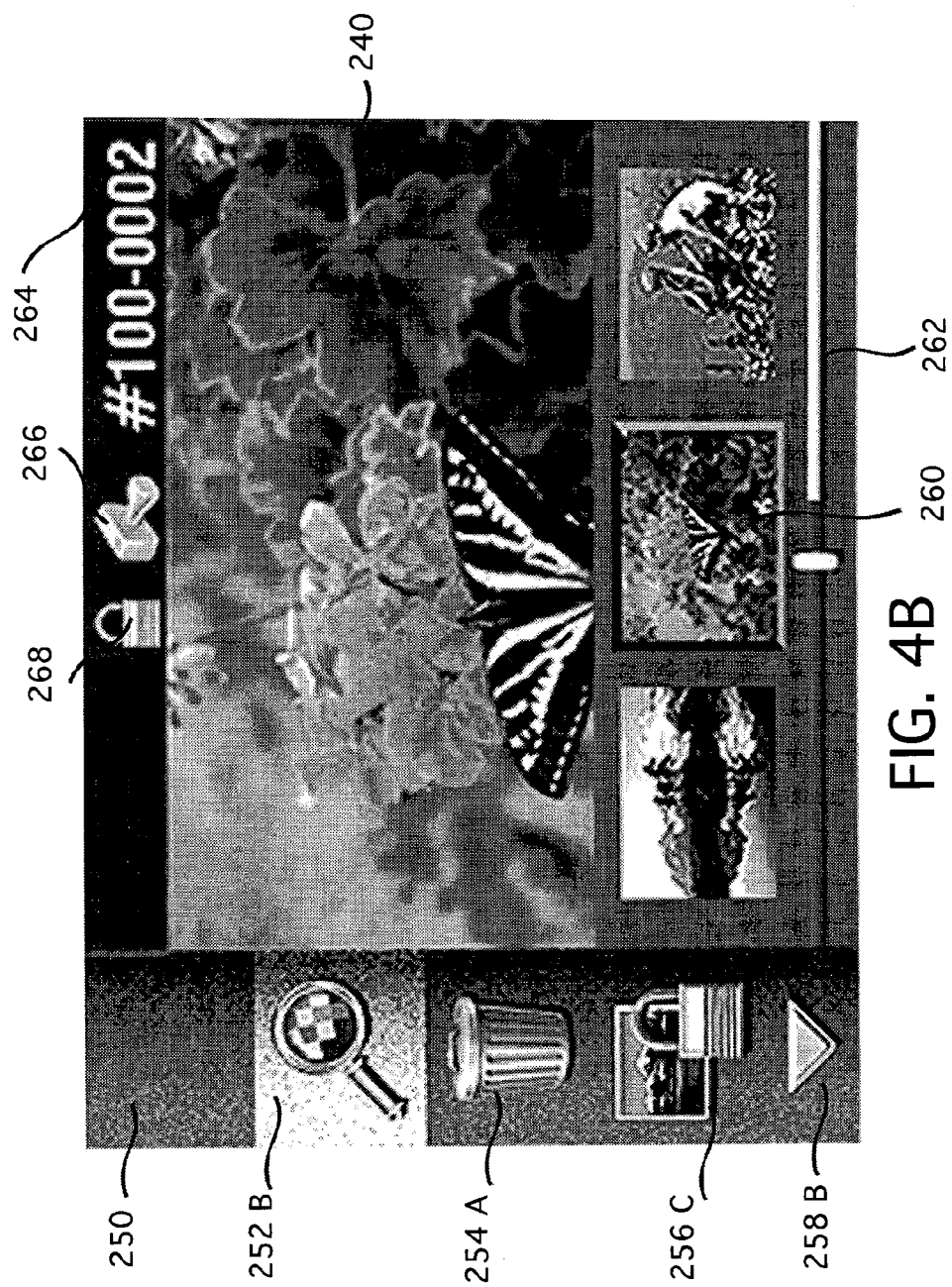
Figure 4C:
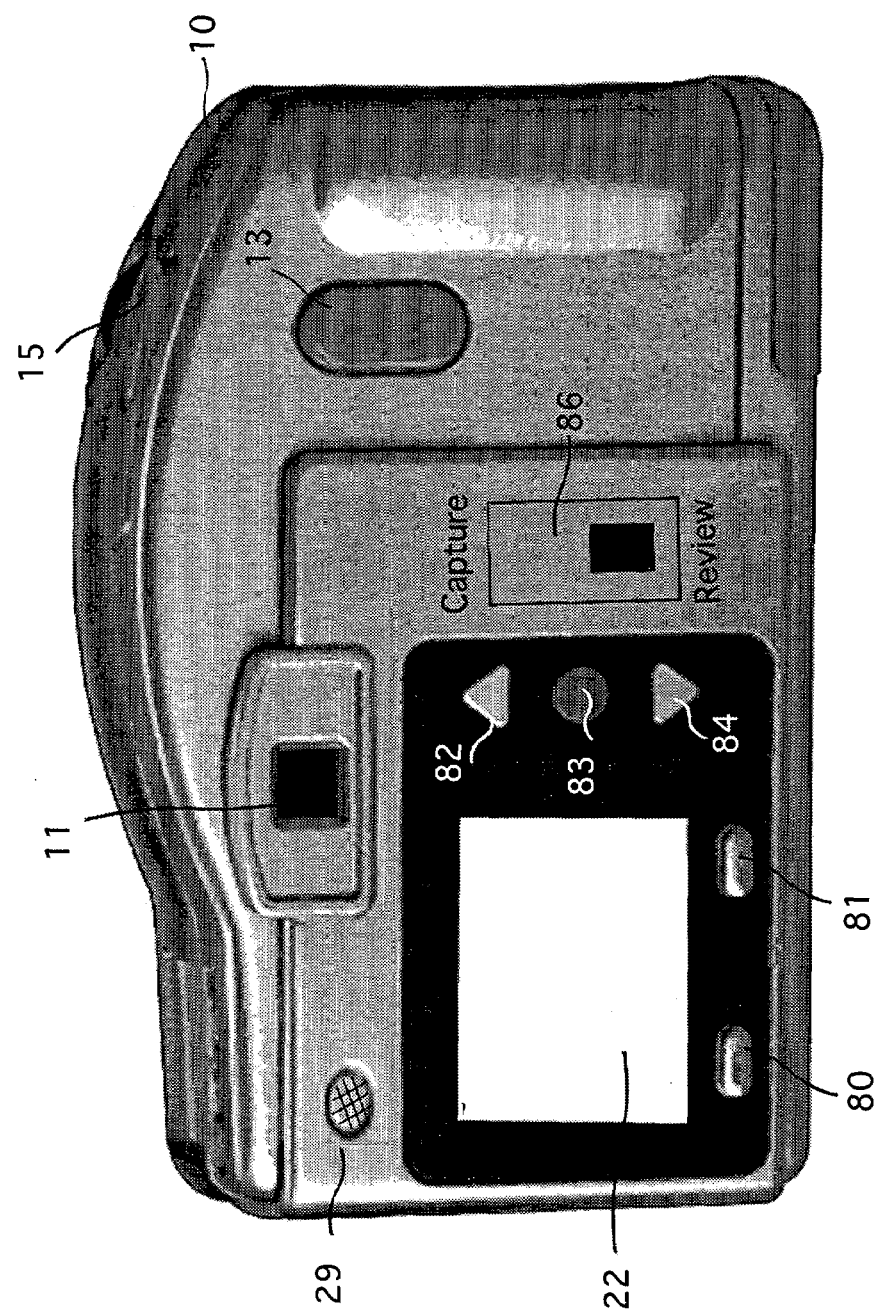
FIG. 4C is a rear view of the digital camera 10 including the color image display 22.

Two different exemplary types of demographically based icons schemes are shown in FIGS. 4A and 4B. The two GUIs use different background colors, character sets, and icon styles to appeal to different demographic groups. These demographically chosen GUIs can be modified in block 190 by the user, who can select a more preferred GUI scheme. The GUI schemes can also include themes, such as a "Winnie the Pooh" or a "Pokemon" theme for a child, or an "X-files" or particular football team (e.g., the Green Bay Packers) theme for an adult, and the appropriate set of icons, having the appropriate text style, colors, and backgrounds will be used. Icons are provided for both the review mode features, enabled when the capture/review mode switch 86 (shown in FIG. 4C) is set in the review position, and for capture mode features, enabled when the capture/review mode switch 86 is set in the capture position.

FIGS. 4A and 4B demonstrate two different graphic user interface (GUI) screens that can be displayed on the image display 22 of the digital camera 10, in response to the demographic classification selected in block 104. Each GUI screen displays a main image 240 and provides the same basic camera functions through a scrollable list of icons 250. The first icon 252A (shown in FIG. 4A) or 252B (shown in FIG. 4B) depict different types of magnifying glasses. Selecting this icon 252A or 252B enables the user to magnify the image on the image display 22, i.e., to rescale the image to show the center portion of the image at a larger size. Both icons 252A and 252B control the same function, but have a different appearance on the image display 22 to best appeal to different user demographic groups, such as different ages or ethnicities. The second icon 254A (shown in FIG. 4A) or 254B (shown in FIG. 4B) depict different styles of trash cans which enable the user to delete the selected picture. The third icon 256A (shown in FIG. 4A) or 256B (shown in FIG. 4B) enables the user to lock the image so that it cannot be inadvertently deleted by the user. The fourth icon 258A (shown in FIG. 4A) or 258B (shown in FIG. 4B) depict different styles of arrows which enable the user to scroll down to view additional icons which provide additional functions. The ability to scroll through this list of features provides the user the ability to view either a large or small number of camera functions.

A representation of a film strip 260 at the bottom of the GUI screens including three small images (i.e., thumbnails), and a memory bar 262 is shown in FIGS. 4A and 4B. These enable the user to easily scroll through and review the images that are stored on the removable memory card 30 of the digital camera 10. An image number 264 is shown in the upper right portion of each GUI screen. FIG. 4B shows two additional icons 266 and 268 at the top of the GUI screen, which represent features that are enabled for the current image. In the GUI screen of FIG. 4B, the presence of icon 266 indicates that the date is overlaid on the picture and the presence of icon 268 indicates that the image is locked so that it cannot be deleted. Note that FIG. 4A does not display icons 266 and 268 to provide a less cluttered screen design, which can be desirable for certain demographic groups (e.g. seniors).

In block 200 of FIG. 2, the user is provided the ability to configure the layout of the camera GUI 25 for any newly selected camera feature(s). Certain features, such as adding or deleting flash modes (e.g., fill flash, red-eye reduction mode, auto mode) have preferred locations in the camera GUI 25 displayed on the color image display 22. Other features, such as the ability to group images into different albums, may not have predefined places in the camera GUI 25. To configure the camera GUI 25, the CPU 50 controls the display monitor 52 to provide the display shown in FIG. 5. As the user enters this phase of the process, the user is given the option of automatically configuring these objects into the camera GUI 25 by selecting an "auto configure" selector 352, or by dragging and dropping icons to a simulation window 300 of the image display 22 of the camera GUI 25 of the desired final camera 10. This simulation window 300 includes a series of icons 362, 364, and 366 that the user can "drag and drop" in order to set their preferred icon order for the camera GUI 25 to be displayed on the color image display 22 of the digital camera 10 (shown in FIG. 1A). A scroll bar 372 having an up arrow 374 and a down arrow 376 enables the user to scroll through the icons 362, 364, and 366. The user arranges the icons 362, 364 and 366 displayed in the simulation window 300 that are used for the review mode by first selecting a "review" button 380, and then arranges another set of icons (not shown) that are displayed in the simulation window 300 for the capture mode by selecting a "capture" button 382.

Figure 5:
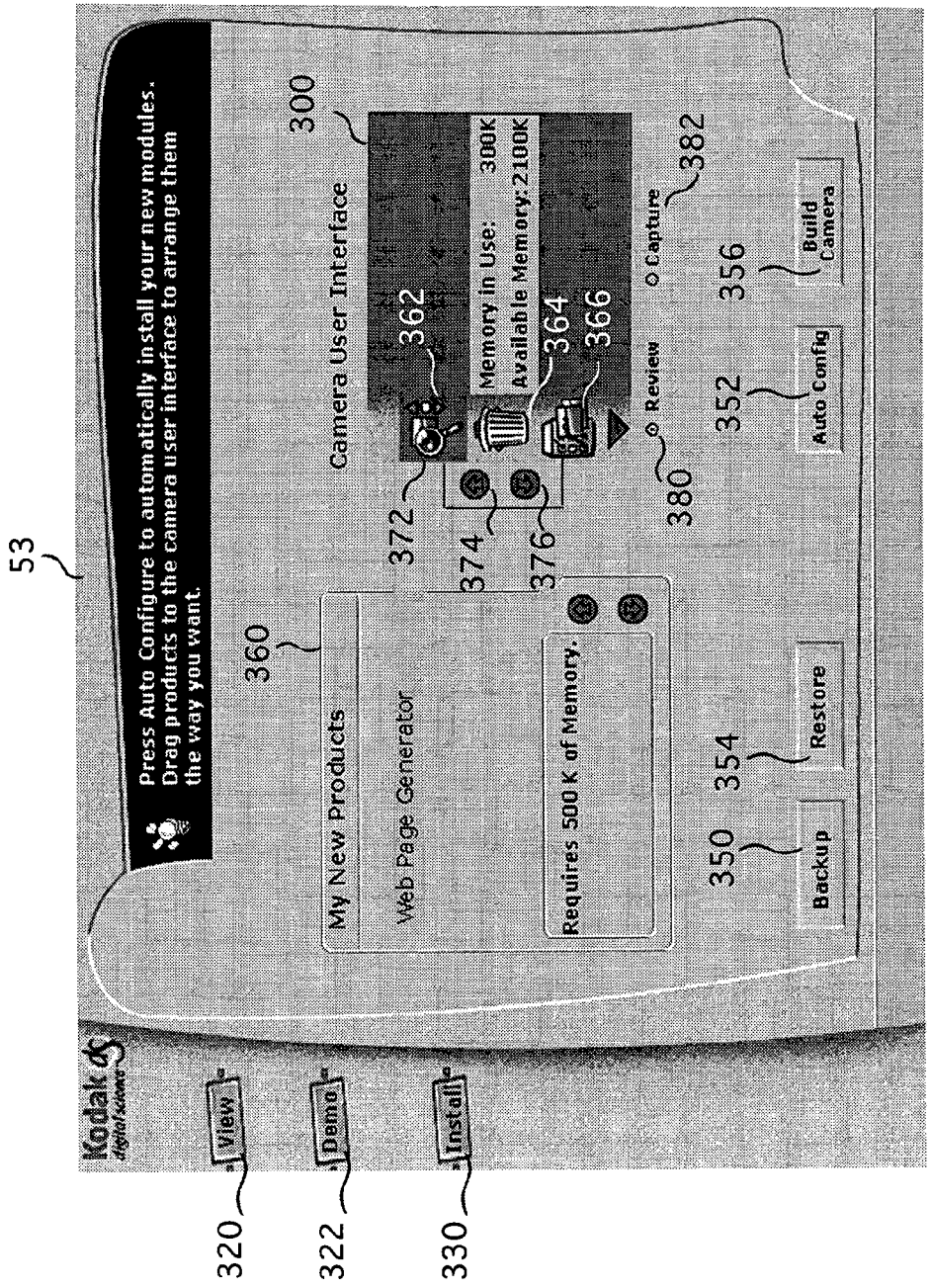
FIG. 5 illustrates an additional graphical screen displayed on the display monitor 52 of FIG. 1B in the process of customizing the digital camera 10 of FIG. 1A, which includes a depiction of the camera graphical user interface of the digital camera 10 of FIG. 1A.

Note that by selecting the "view" selector 320 shown in FIG. 5, the user can return to an earlier step in the process (e.g., block 160 of FIG. 2) if he or she wants to review other features. The user can also demo the various firmware-enabled camera options by selecting the product in a product window 360, and then selecting the "demo" selector 322. The user also has some other options. For example, the user can backup the customized camera firmware to be stored in the Flash EPROM 28 to a file on the host computer 40 by selecting a "backup" selector 350, or restore an earlier configuration from a file on the host computer 40 to override the current configuration by selecting a "restore" selector 354.

FIG. 5 also includes an "install" selector 330. In block 210 of FIG. 2, this instructs the camera customization software to configure the new firmware components and upload them to the firmware stored in the Flash EPROM 28 in the digital camera 10 in order to customize the camera features and the camera user interface 24. In some cases, this can be done by first erasing some of the firmware installed in Flash EPROM 28, and then uploading the new firmware components. Alternatively, the camera customization software provided on the CD-ROM 32 or the Floppy disk 34 can include camera source code that must be compiled by a firmware compiler (not shown) designed to produce firmware capable of being executed by the processor 18, before being downloaded to the digital camera 10. In this situation, the camera customization software also includes the necessary compiler software, which is executed when the user selects a "build camera" selector 356 shown on the screen 53 in FIG. 5 which is displayed on the display monitor 52 shown in FIG. 1B. This enables the camera firmware to be "built" (e.g., compiled) to create a firmware component that provides all of the new user selected features, as well as the demographically based parameter values. After this firmware component has been created by the compiler, the "install" selector 330 is used to initiate the downloading of the compiled firmware component to the digital camera 10. If the user is unhappy with the features provided by the newly installed firmware, the user can re-install an older firmware component by using the "restore" selector 354 followed by the "install" selector 330.

Figure 6:
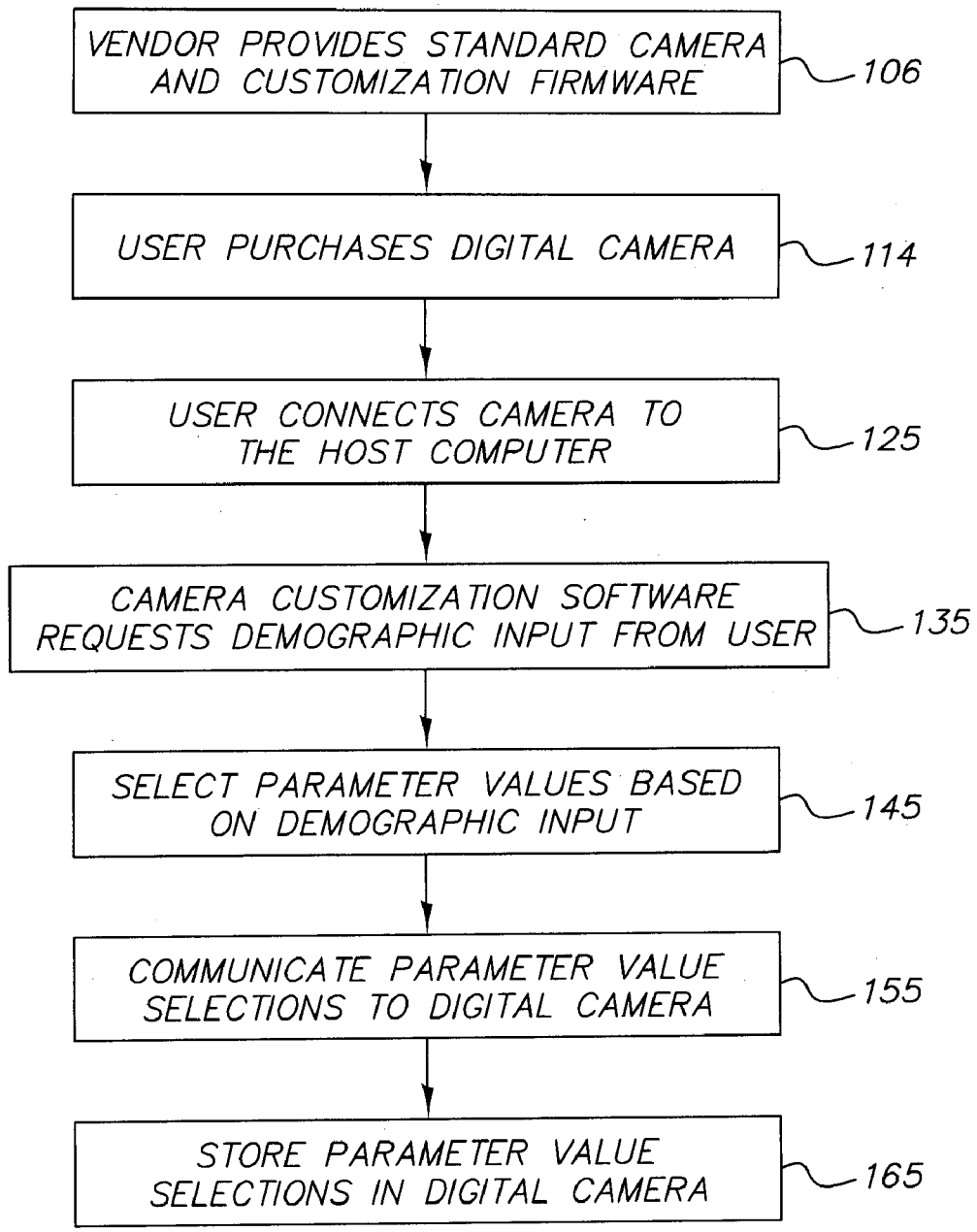
FIG. 6 illustrates an alternative embodiment for customizing a digital camera 10 based on demographic factors.

FIG. 6 is a flow chart depicting the steps of another embodiment of the present invention. In this embodiment, standard cameras (e.g. cameras that are not customized using demographic factors) are provided by the camera vendor along with camera customization software. The camera customization software asks the user to provide demographic information, by responding to a series of questions. The answers to these questions are used to customize the digital camera 10 based on demographic factors.

In block 106 of FIG. 6 a vendor provides a standard digital camera 10 and customization software, for example a CD-ROM disc 32.

In block 114, the user purchases the digital camera 10. The same digital camera 10 is purchased by all users, regardless of demographics.

In block 125, the user connects the digital camera 10 to the host computer 40, as was described earlier in relation to FIG. 2.

In block 135 of FIG. 6, the camera customization software requests demographic input from the camera user. This may be done by making the selections shown in FIG. 7.

Figure 7:
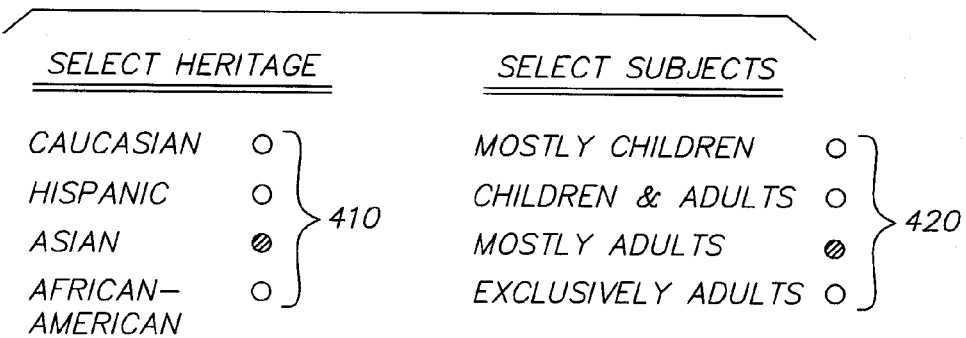
FIG. 7 depicts a graphical screen used in the process of FIG. 6.

FIG. 7. depicts a first group of radio buttons 410 for selecting a heritage (including Caucasian, Hispanic, Asian, and African-American) and a second group of radio buttons 420 for selecting types of subjects (mostly children, children and adults, mostly adults, exclusively adults).

In block 145, the user selected radio buttons in FIG. 7 provide demographic input, which is used to select appropriate parameter values, as was described earlier relative to Tables I-IV.

In block 155, the parameter value selections are communicated to the digital camera 10 over the cable interface 36.

In block 165, the parameter value selections are stored in the Flash EPROM memory 28 of the digital camera 10.

Therefore, the process depicted in the flow chart of FIG. 6 in accordance with the present invention enables the camera customization software executed by the CPU 50 to customize the digital camera 10 based on demographic factors.

In addition to customizing the digital camera 10 based on demographic factors, the camera customization software executed by the CPU 50 can provide the user with the ability to select from many different features that may be provided by the firmware executed by the processor 18 in the digital camera 10. In addition to the features described in reference to FIG. 2, additional features can include:

Configuring the firmware stored in the Flash EPROM 28 in the digital camera 10 to add firmware components which provide special effects features, such as posterization or "coloring book" creative effects, monochrome or 20 sepia effects, and special effects filters (e.g., star, defocus corners);

Configuring the firmware stored in the Flash EPROM 28 in the digital camera 10 to enable the user to upload, from the host computer 40 to the digital camera 10, particularly memorable personal images for sharing with others via the color image display 22 of the digital camera 10;

Configuring the firmware stored in the Flash EPROM 28 in the digital camera 10 to add a "slide show" capability to the digital camera 10 for automatically reviewing the image on an LCD or video display, for a selected period (e.g., five seconds per image) including "transition" effects (e.g. fades or pulls) from one image to the next;

Configuring the firmware stored in the Flash EPROM 28 in the digital camera 10 to add unique sounds to the camera user interface 24, such as, for example, funny noises as pictures are taken;

Configuring the firmware stored in the Flash EPROM 28 in the digital camera 10 to support various image resolution or compression levels, compression algorithms, or image tile formats, or to provide the ability to modify captured images as they are processed, such as by digital zooming and cropping, tone or color adjustments, or sharpness adjustments;

Configuring the firmware components stored in the Flash EPROM 28 in the digital camera 10 to provide the ability to select one or more border templates that may be combined with newly captured digital images, as described in commonly assigned U.S. Pat. No. 5,477,264 to Sarbadhikari et al., the disclosure of which is herein incorporated by reference;

Configuring the firmware components stored in the Flash EPROM 28 in the digital camera 10 to group images into various categories or folders, as described in commonly assigned U.S. Pat. No. 5,633,678 to Parulski, the disclosure of which is herein incorporated by reference;

Configuring the firmware components stored in the Flash EPROM 28 in the digital camera 10 to provide the ability to stitch multiple images together to produce panoramic images, such as by using the method described in commonly assigned U.S. patent application Ser. No. 09/224,547, filed Dec. 31, 1998 to Parulski, the disclosure of which is herein incorporated by reference;

Configuring the firmware components stored in the Flash EPROM 28 in the digital camera 10 to provide print ordering from the camera, as described in commonly-assigned U.S. patent application Ser. No. 08/977,382, filed Nov. 24, 1997 to Parulski, the disclosure of which is herein incorporated by reference;

Configuring the firmware components stored in the Flash EPROM 28 in the digital camera 10 to composite multiple images together, for example, using the method and apparatus described in commonly-assigned U.S. Pat. No. 5,914,748 to Parulski, the disclosure of which is herein incorporated by reference;

Configuring the firmware components stored in the Flash EPROM 28 in the digital camera 10 to create html files to arrange the images into 10 a web page that has a customized background color, header text, image date/titles, and image size; and Configuring the firmware components stored in the Flash EPROM 28 in the digital camera 10 to provide the ability to e-mail images from the digital camera 10, for example, as described in commonly-assigned U.S. patent application Ser. No. 09/004,046, filed Jan. 7, 1998 to Ward, the disclosure of which is herein incorporated by reference.

Depending on the features selected, the user must provide appropriate personalization information that will later be incorporated into the customized digital camera 10. Such personalization information can include personal digital data, for example, ASCII text providing the name, mailing address, phone number, or e-mail address of the user. The personalization information can also include names of people or events to be used to categorize images, and an address book of e-mail addresses to be displayed on the color image display 22. The personalization information can also include one or more border templates selected by the user.

In an alternative embodiment, demographically customized camera firmware is uploaded to the digital camera 10 by storing the firmware on the removable memory card 30 using the memory card reader 48, inserting the removable memory card 30 into memory card interface 20 of the digital camera 10, and uploading the camera customization software from the removable memory card 30 to the Flash EPROM 28 as described in commonly-assigned U.S. Pat. No. 5,477,264, entitled "Electronic Imaging System Using a Removable Software-Enhanced Storage Device" to Sarbadhikari et al., the disclosure of which is herein incorporated by reference.

In another alternative embodiment, the firmware memory is provided as a Read Only Memory (ROM) (not shown) that stores firmware that provides parameter values for a plurality of different demographic groups. The digital camera 10 also includes a programmable memory (not shown), which stores a demographic group setting. The processor 18 uses the parameter values corresponding to the current demographic group setting, for example the preflash level, tone scale look-up table, and color matrix provided for that demographic group setting. In this embodiment, the camera GUI 25 enables the user to select a particular demographic group from among a plurality of possible demographic groups. The user selection is then stored as the demographic group setting.

In another embodiment, the demographic customization is done in a retail establishment which sells the digital camera 10. The camera firmware stored in the Flash EPROM 28 is customized at the time of purchase, for example by a clerk operating a computer and selecting an appropriate demographic group for the user, or by a customer-operated kiosk.

In another embodiment, the camera customization software permits two or more different users to customize the digital camera 10 based on demographic input, and to store the corresponding firmware components or firmware settings in the Flash EPROM 28. When the digital camera 10 is powered on, a list of users is displayed on the color image display 22 and the user selects their name using the camera user interface 24. In response to this user input, the processor 18 uses the appropriate firmware components or firmware settings stored in the Flash EPROM 28 to provide the demographically customized camera GUI and feature set for that particular user. Alternatively, when the digital camera 10 is powered on, the settings for the last user can be employed, and a camera preferences menu can be used to select a different user.

Figure 8:
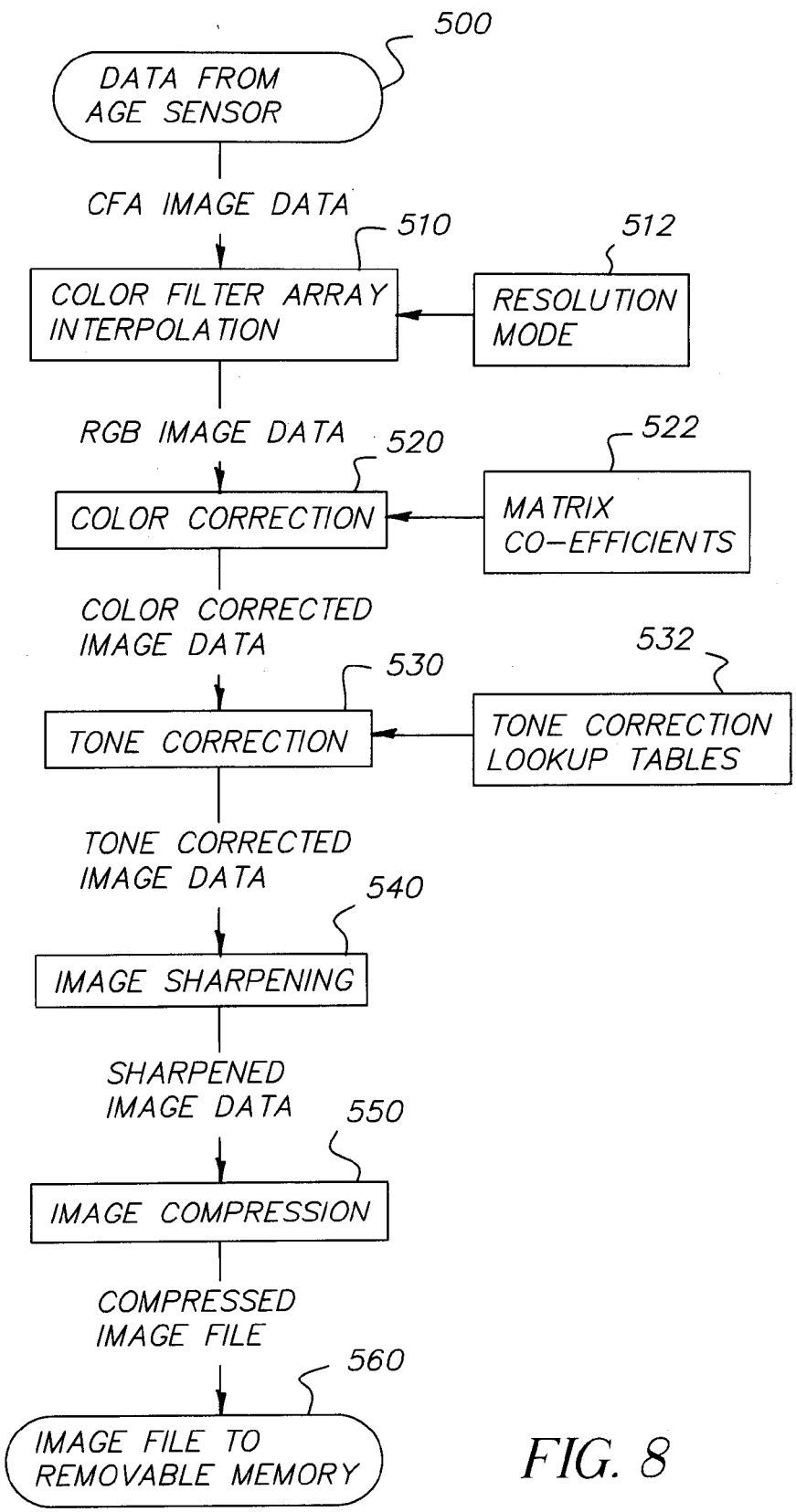
FIG. 8 is a flow diagram depicting image processing operations performed within the digital camera 10 of FIG. 1A.

FIG. 8 is a flow diagram depicting image processing operations that can be performed by the processor 18 in the digital camera 10 in order to process the images from the image sensor 14 provided by the A/D converter 16. The processing performed by the digital camera 10 to process a particular image is determined by a demographic classification. In particular, the color correction matrix and tone correction lookup table are determined to provide preferred skin tone reproduction for the particular demographic classification.

The Bayer pattern color filter array data (block 500) which has been digitally converted by the A/D converter 16 is interpolated in block 510 to provide red, green and blue (RGB) image data values at each pixel location. The color filter array interpolation in block 510 can use the luminance CFA interpolation method described in commonly-assigned U.S. Pat. No. 5,652,621, entitled "Adaptive color plane interpolation in single sensor color electronic camera" to Adams et. al., the disclosure of which is herein incorporated by reference. The color filter array interpolation in block 510 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

To provide multiple resolution images, for example, a full resolution image and a reduced resolution image, the color filter array 20 interpolation in block 510 can use the method described in commonly-assigned U.S. Pat. No. 5,493,335, entitled "Single sensor color camera with user selectable image record size", to Parulski et. al., the disclosure of which is herein incorporated by reference.

The RGB image data is color corrected in block 520 using, for example, the 3×3 linear space color correction matrix 20 depicted in FIG. 3 of commonly-assigned U.S. Pat. No. 5,189,511, entitled "Method and apparatus for improving the color rendition of hardcopy images from electronic cameras" to Parulski et al., the disclosure of which is incorporated herein by reference. The color correction matrix co-efficients are choosen to provide preferred skin tone reproduction for the demographic group, as described earlier in relation to Table IV.

The color corrected image data is tone corrected in block 530. This tone correction 530 can use, for example, the lookup table corresponding to FIG. 2 of U.S. Pat. No. 5,189,511 cited above. The lookup table is choosen to provide preferred skin tone reproduction for the demographic group, as described earlier in relation to Table IV.

The image sharpening provided in block 540 of FIG. 8 can utilize the method described in commonly-assigned U.S. Pat. No. 4,962,419 ('419 patent), entitled "Detail processing method and apparatus providing uniform processing of horizontal and vertical detail components" to Hibbard et. al., the disclosure of which is incorporated herein by reference.

The image compression provided in block 550 of FIG. 8 can use the method described in commonly-assigned U.S. Pat. No. 4,774,574 (the '574 patent), entitled "Adaptive block transform image coding method and apparatus" to Daly et. al., the disclosure of which is incorporated herein by reference.

Figure 9A:
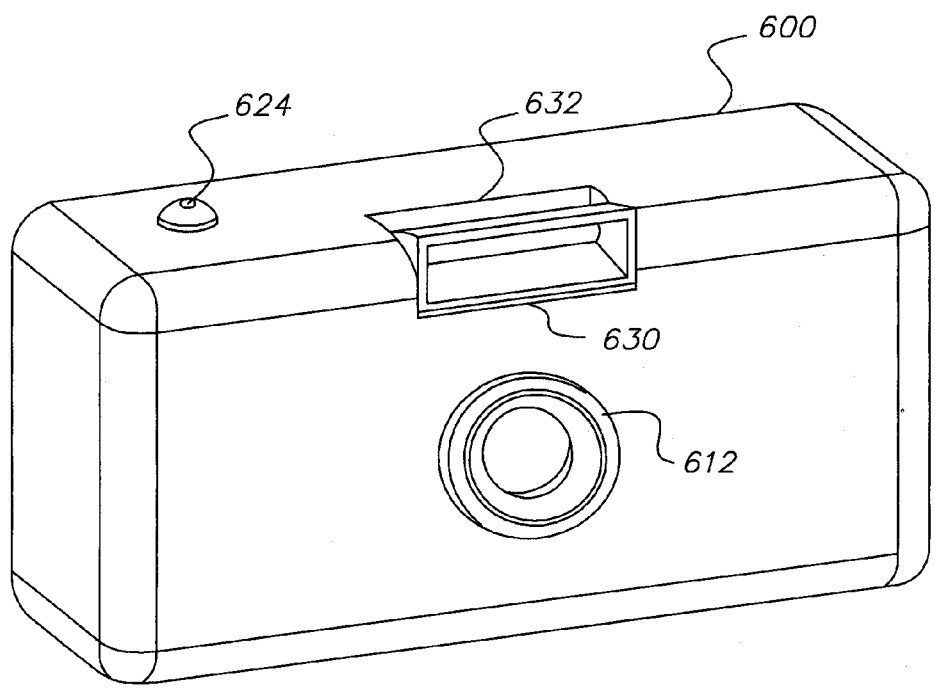
FIG. 9A and FIG. 9B depict a camera that can be customized based on demographic factors.
Figure 9B:
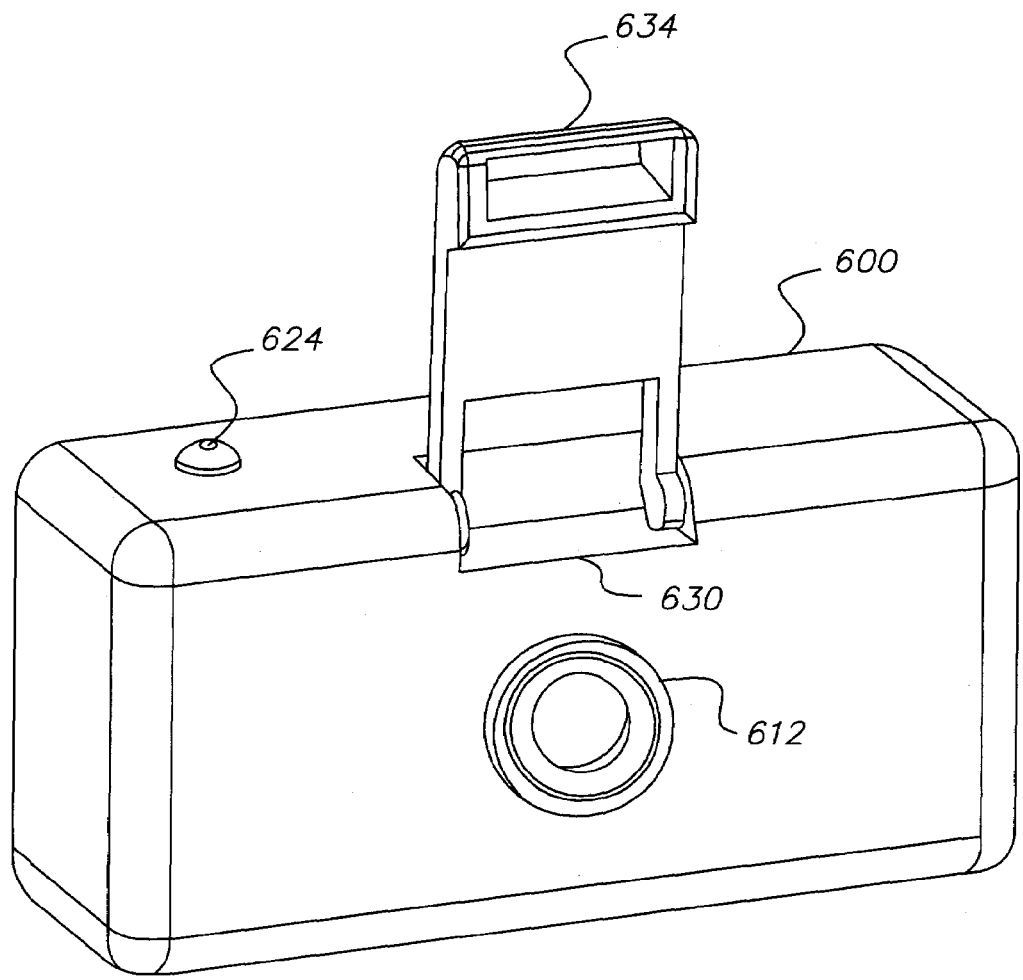

FIG. 9A and FIG. 9B depict an embodiment of a camera 600, which can be a conventional film camera or a digital camera, that can be customized based on demographic factors. The camera 600 includes a lens 612 and a shutter button 624. A slot 630 above the lens 612 is designed to accept either a simple flashtube 632 (FIG. 9A) or a pivoting "cobra" flash 634 (FIG. 9B). At the time the camera 600 is manufactured, one of the two flash units (e.g. either the simple flashtube 632 or the pivoting flash 634) is installed into slot 630, depending on the demographic population of the market where the camera 600 will be sold. For example, if the camera 600 is to be sold in a European market such as Denmark, where there is a primarily Caucasian customer population, the pivoting flash 634 is installed into slot 630, in order to provide a relatively large flash to lens distance to minimize redeye. On the other hand, if the camera 600 is to be sold in a Far East market, such as Taiwan, where there is a primarily Asian population that is less susceptible to redeye, the simple flash 632 is installed into slot 630, in order to reduce the cost of the camera 600 and produce less bothersome shadows.

Computer program products, such as readable storage medium, can be used to store the customization software, and also the desired firmware components in accordance with the present invention. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the spirit and scope of the invention.

Parts List

| | |
|---|---|
| 10 | digital camera |
| 11 | optical viewfinder |

-continued
Parts List

| | |
|---|---|
| 12 | lens |
| 13 | zoom switch |
| 14 | image sensor |
| 15 | shutter button |
| 16 | analog-to-digital converter |
| 18 | processor |
| 19 | zoom lens drive |
| 20 | memory card interface |
| 21 | flash unit |
| 22 | image display |
| 23 | video output driver |
| 24 | camera user interface |
| 25 | camera graphical user interface |
| 26 | host interface |
| 27 | digital-to-analog converter |
| 28 | Flash EPROM |
| 29 | miniature speaker |
| 30 | removable memory card |
| 31 | TV display |
| 32 | CD-ROM disc |
| 34 | Floppy disk |
| 36 | interface cable |
| 40 | host computer |
| 42 | CD-ROM drive |
| 44 | Floppy disk drive |
| 46 | interface |
| 48 | memory card reader |
| 50 | central processing unit |
| 52 | display monitor |
| 53 | screen |
| 54 | keyboard |
| 55 | mouse |
| 56 | hard drive |
| 58 | home printer |
| 60 | modem |
| 70 | Network Service Provider |
| 72 | modem |
| 74 | computer |
| 76 | camera firmware database |
| 78 | billing system |
| 80 | user button |
| 81 | user button |
| 82 | user button |
| 83 | user button |
| 84 | user button |
| 86 | capture/review mode switch |
| 102 | block |
| 104 | block |
| 106 | block |
| 112 | block |
| 114 | block |
| 125 | block |
| 130 | block |
| 135 | block |
| 140 | block |
| 145 | block |
| 150 | block |
| 155 | block |
| 160 | block |
| 165 | block |
| 170 | block |
| 180 | block |
| 190 | block |
| 200 | block |
| 210 | block |
| 240 | main image |
| 250 | list of icons |
| 252A, 252B | first icon |
| 254A, 254B | second icon |
| 256A, 256B | third icon |
| 258A, 258B | fourth icon |
| 260 | filmstrip |
| 262 | memory bar |
| 264 | image number |
| 266 | icon |
| 268 | icon |
| 300 | simulation window |

-continued

| Parts List | |
|---|---|
| 305 | window |
| 310 | product option window |
| 312 | scroll bar |
| 314 | up arrow |
| 316 | downarrow |
| 318 | "Beastly Vampires" line |
| 320 | "view" selector |
| 322 | "demo" selector |
| 324 | "purchase" selector |
| 330 | "install" selector |
| 332 | "restore features" selector |
| 340 | description window |
| 342 | "select" selector |
| 344 | "next" selector |
| 350 | "backup" selector |
| 352 | "auto configure" selector |
| 354 | "restore" selector |
| 356 | "build camera" selector |
| 360 | product window |
| 362 | icon |
| 364 | icon |
| 366 | icon |
| 372 | scroll bar |
| 374 | up arrow |
| 376 | down arrow |
| 380 | "review" button |
| 382 | 'capture' button |
| 410 | radio buttons |
| 420 | radio buttons |
| 500 | block |
| 510 | block |
| 512 | block |
| 520 | block |
| 521 | block |
| 530 | block |
| 532 | block |
| 540 | block |
| 550 | block |
| 560 | block |
| 600 | camera |
| 612 | lens |
| 624 | shutter button |
| 630 | slot |
| 632 | flashtube |
| 634 | pivoting flash |
| 740 | vendor computer |
| 746 | interface |
| 748 | memory card reader |
| 750 | central processing unit |
| 752 | display monitor |
| 754 | keyboard |
| 755 | mouse |
| 756 | hard drive |
| 758 | label printer |

What is claimed is:

1. A method for customizing a camera for at least one particular demographic group by storing at least one parameter value in a programmable memory of the camera to control at least one operation of the camera, the method comprising the steps of:
   a) identifying at least one camera parameter having a preferred value for at least one demographic group that differs from the standard value for said parameter;
   b) selecting a demographic classification for the camera based on the expected heritage of the at least one demographic group; and
   c) programming the programmable memory of the camera to set the parameter value to the preferred value for the selected demographic classification and using the parameter to control redeye reduction.

2. The method of claim 1 wherein the camera includes a flash unit capable of providing a main flash and a preflash, and the parameter value controls the light level of the preflash.

3. The method of claim 1 wherein the camera is a digital camera.

4. The method of claim 3 wherein the parameter value modifies the skin tone reproduction of digital images captured by the digital camera.

5. The method of claim 4 wherein the parameter value provides a plurality of matrix coefficients which control the color correction provided by the digital camera.

6. The method of claim 1 wherein the demographic classification is selected by a camera user.

7. The method of claim 6 wherein the demographic classification is selected using a software program which displays a plurality of demographic classifications to the user.

8. The method of claim 1 wherein the demographic classification is selected as the camera is manufactured.

9. The method of claim 1 wherein the demographic classification is selected as the camera is sold to a user.

10. A digital camera configured according to the method of claim 1.

11. A computer readable medium having computer executable instructions for performing the method of claim 1.

12. The method according to claim 1 wherein the camera includes first and second camera graphical user interfaces responsive to firmware stored in the programmable memory, wherein the first camera graphical user interface is configured for a first demographic classification, and the second camera graphical user interface, which is different from the first camera graphical user interface, is configured for a second demographic classification.

13. The method according to claim 12, wherein the first and second camera graphical user interfaces use different icon styles.

14. The method according to claim 12, wherein the first and second camera graphical user interfaces use different color sets.

15. A method for customizing cameras for a first demographic group and at least one other demographic group as the cameras are manufactured, the method comprising the steps of:
   a) identifying a particular camera feature which is more important for the first demographic group than for the second demographic group;
   b) classifying the cameras based on the expected heritage of one of the demographic groups; and
   c) customizing the cameras classified using the first demographic group such that only these cameras are manufactured in a way that includes the particular camera feature wherein the particular camera feature reduces redeye.

16. The method of claim 15 wherein the particular camera feature provides an increased flash to lens distance.

17. The method of claim 15 wherein the particular camera feature provides a pivoting flash.

18. A method for customizing cameras for a first demographic group, wherein the first demographic group has a relatively higher frequency of redeye than a second demographic group, the method comprising the steps of:
   a) determining if the camera is intended for the first demographic group wherein the demographic classification of the camera is based on the expected heritage of the first demographic group; and b) if and only if it is determined that the camera is intended for the first demographic group, customizing the camera so that the camera provides a reduced redeye effect.

19. The method of claim 18 wherein the step of customizing the camera provides an increased flash to lens distance.

20. The method of claim 18 wherein the step of customizing the camera provides a pivoting flash.

* * * * *